(12) United States Patent
Kelly

(10) Patent No.: US 6,448,922 B1
(45) Date of Patent: Sep. 10, 2002

(54) RETROFIT SOLUTION FOR THE INTEGRATION OF GROUND-BASED WEATHER RADAR IMAGES WITH ON-BOARD WEATHER RADAR

(75) Inventor: Wallace E. Kelly, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/645,666

(22) Filed: Aug. 24, 2000

(51) Int. Cl.[7] ............................. G01S 13/95; G01S 7/04
(52) U.S. Cl. ............................. 342/26; 342/52; 342/58; 342/175; 342/176; 342/195
(58) Field of Search .................. 342/26, 175, 176–186, 342/195, 58, 52; 340/945

(56) References Cited

U.S. PATENT DOCUMENTS 5,805,100 A * 9/1998 Becker et al. ................. 342/26
6,043,756 A * 3/2000 Bateman et al. ............ 340/945

* cited by examiner

Primary Examiner—Bernarr E. Gregory
(74) Attorney, Agent, or Firm—Nathan O. Jensen; Kyle Eppele

(57) ABSTRACT

A method of integrating ground-based radar information into an existing on-board aircraft radar system, where a radar indicator displays on-board radar images as a function of data words received from a receiver/transmitter of the on-board aircraft radar system, includes receiving ground-based radar data indicative of a ground-based radar image. A data word from an output stream of the receiver/transmitter of the on-board aircraft radar system is captured, with the captured data word being encoded in a first data word format. A position and heading of the aircraft is determined, and the ground-based radar data is sampled to obtain sampled ground-based radar data corresponding to the position and heading of the aircraft and to a radial scan angle for the captured data word. The sampled ground-based radar data and the captured data word are combined into a composite data word, with the composite data word being encoded in the first data word format. The composite data word is provided to the radar indicator for use in displaying a composite weather radar image having both on-board weather radar imagery and ground-based weather radar imagery.

17 Claims, 11 Drawing Sheets

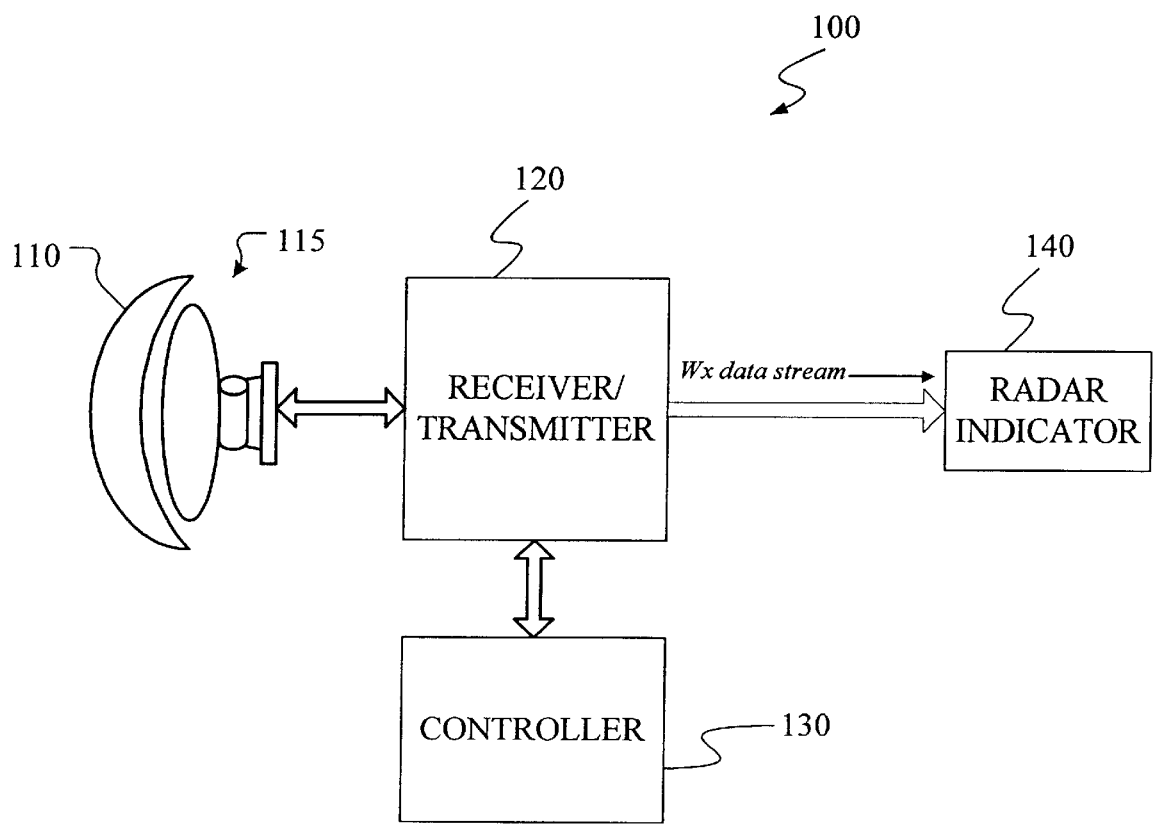
PRIOR ART
FIG. 1

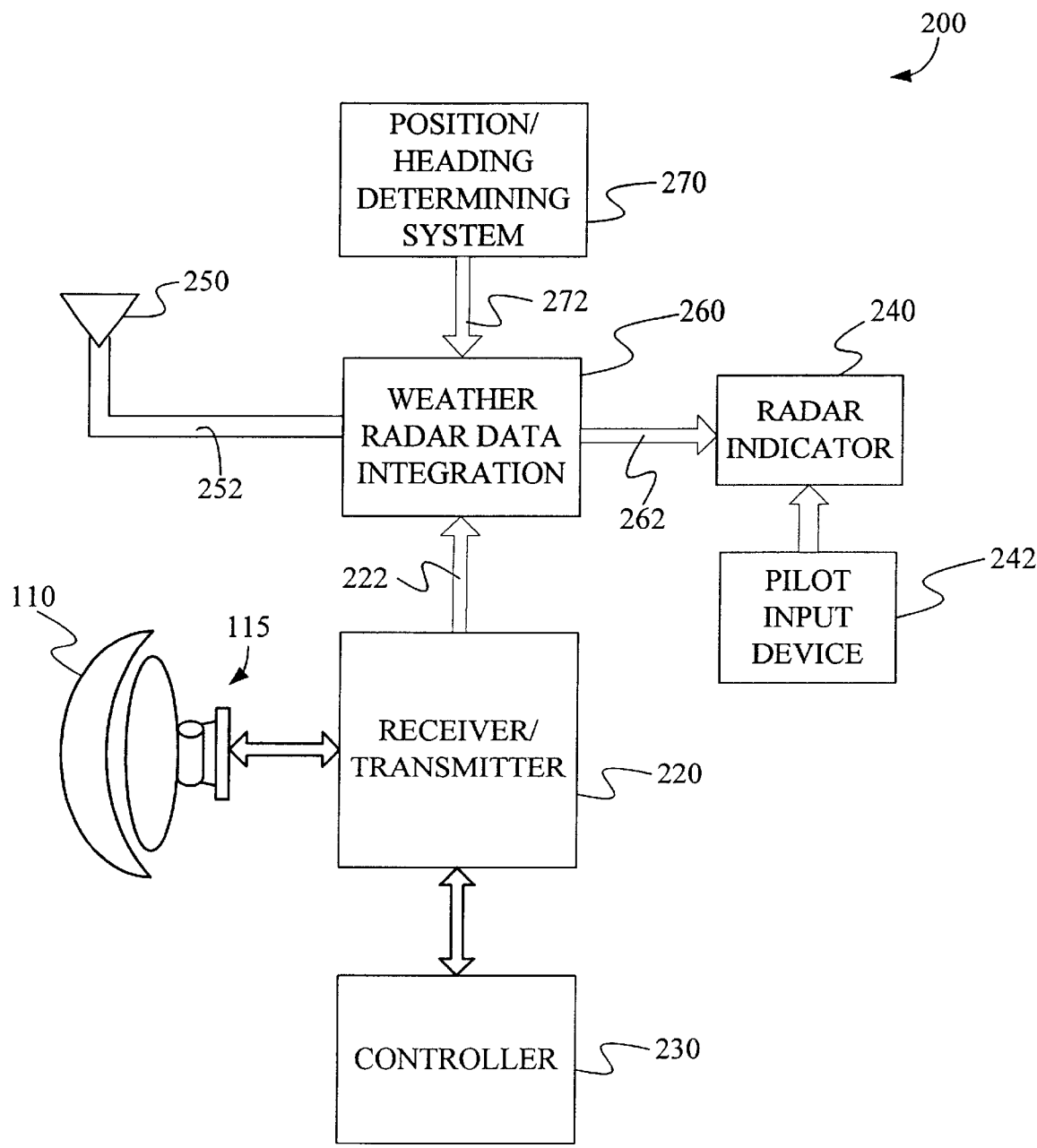
FIG. 2

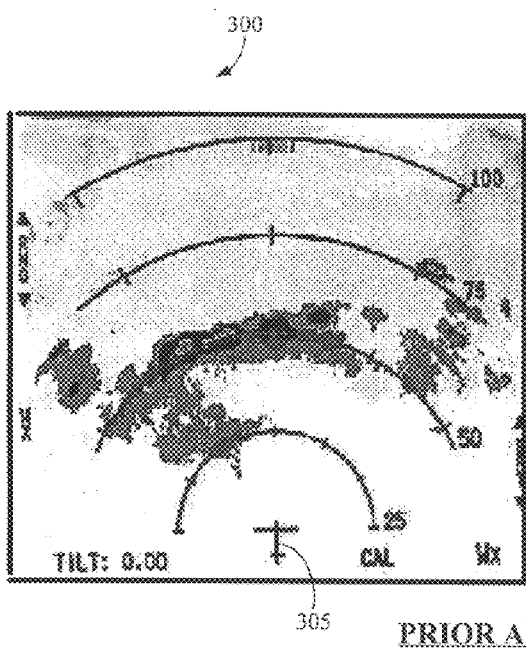
PRIOR ART
FIG. 3A
PRIOR ART
FIG. 3B

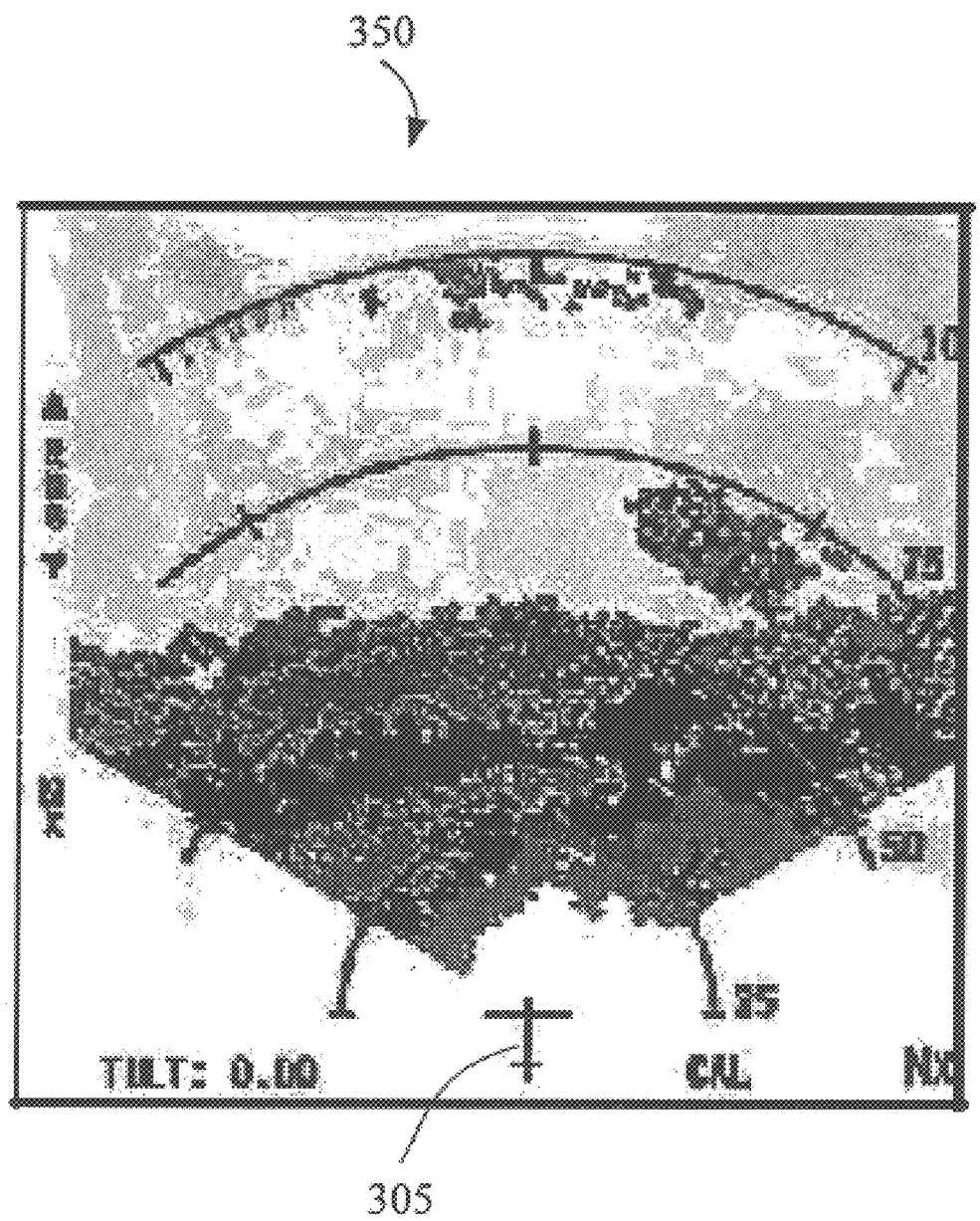
FIG. 4A

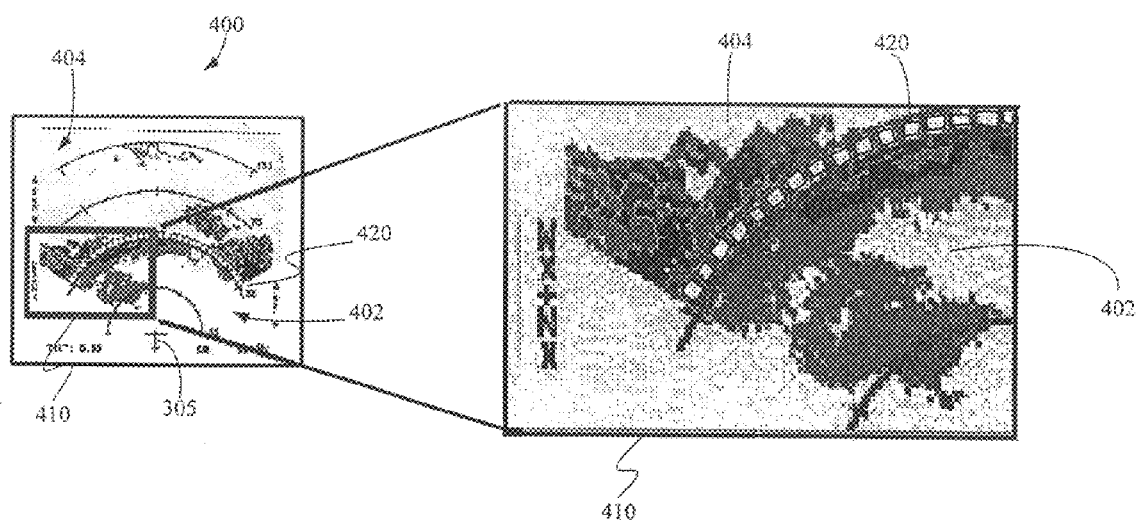
FIG. 4B

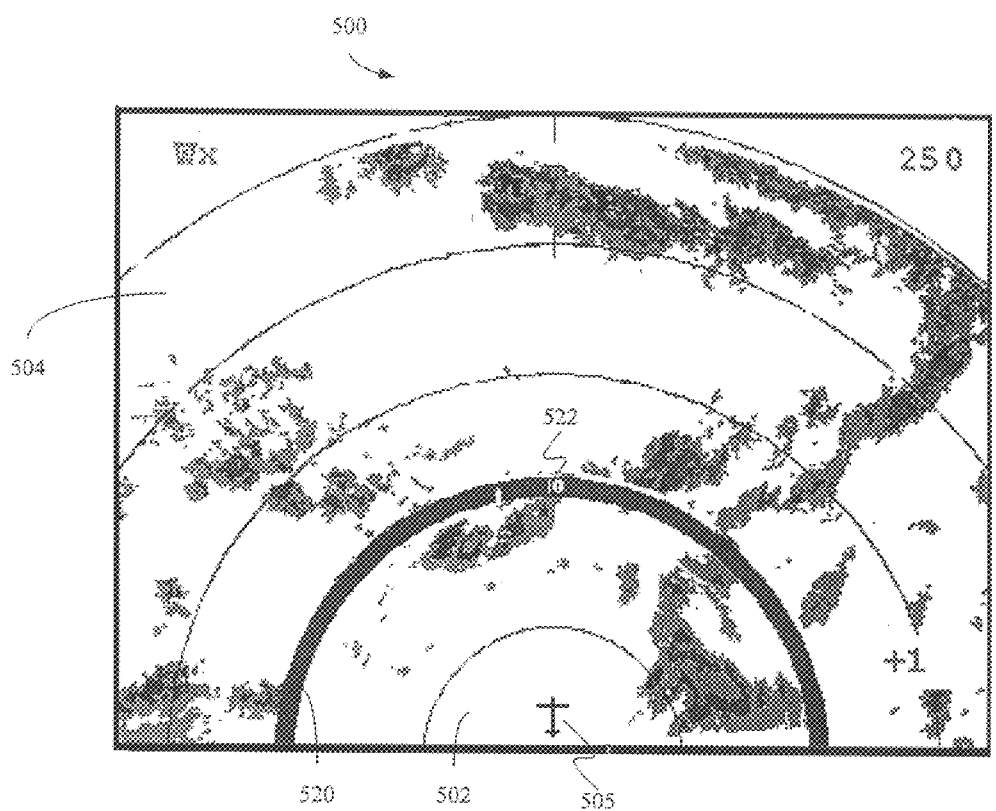
FIG. 5A

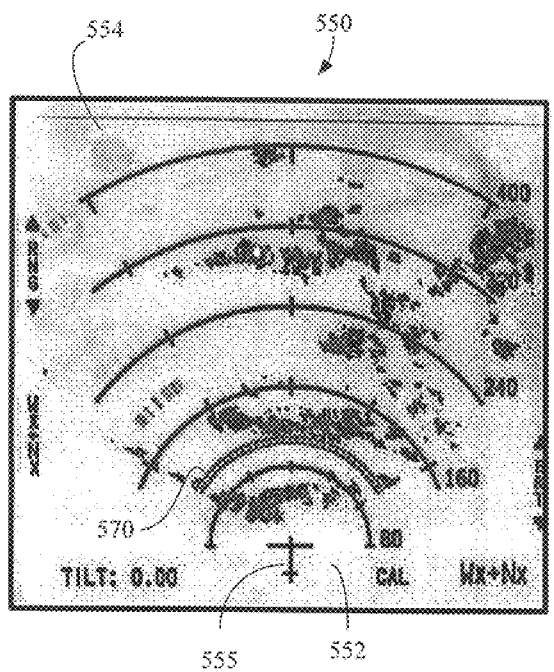
FIG. 5B
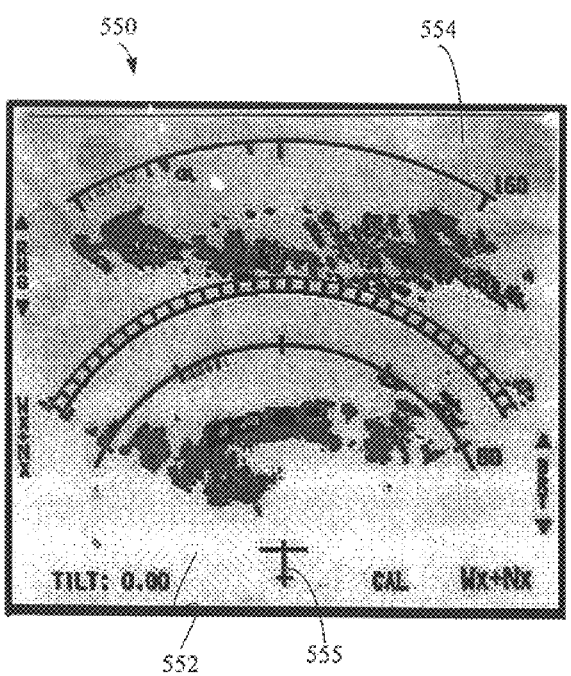
FIG. 5C

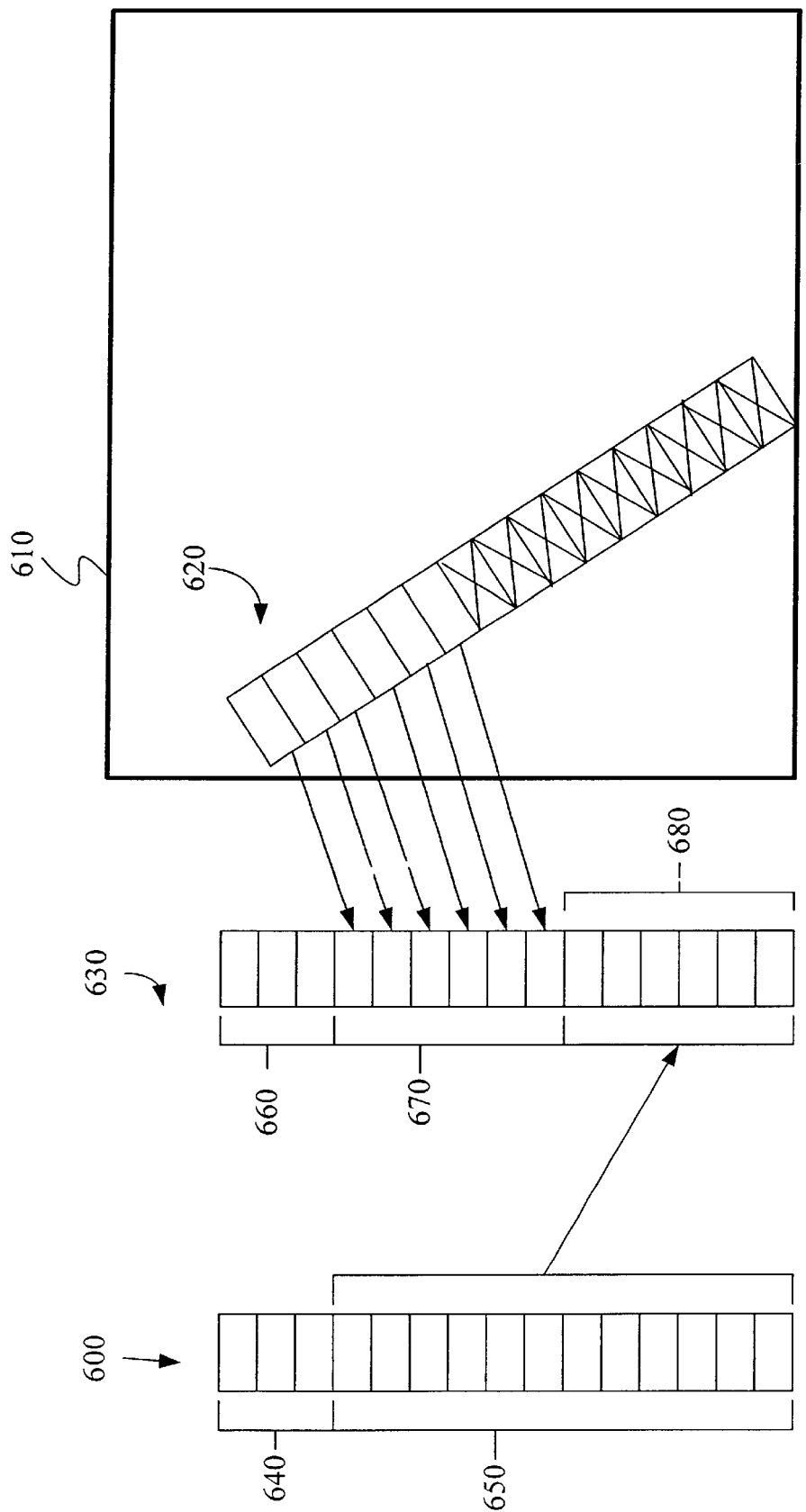

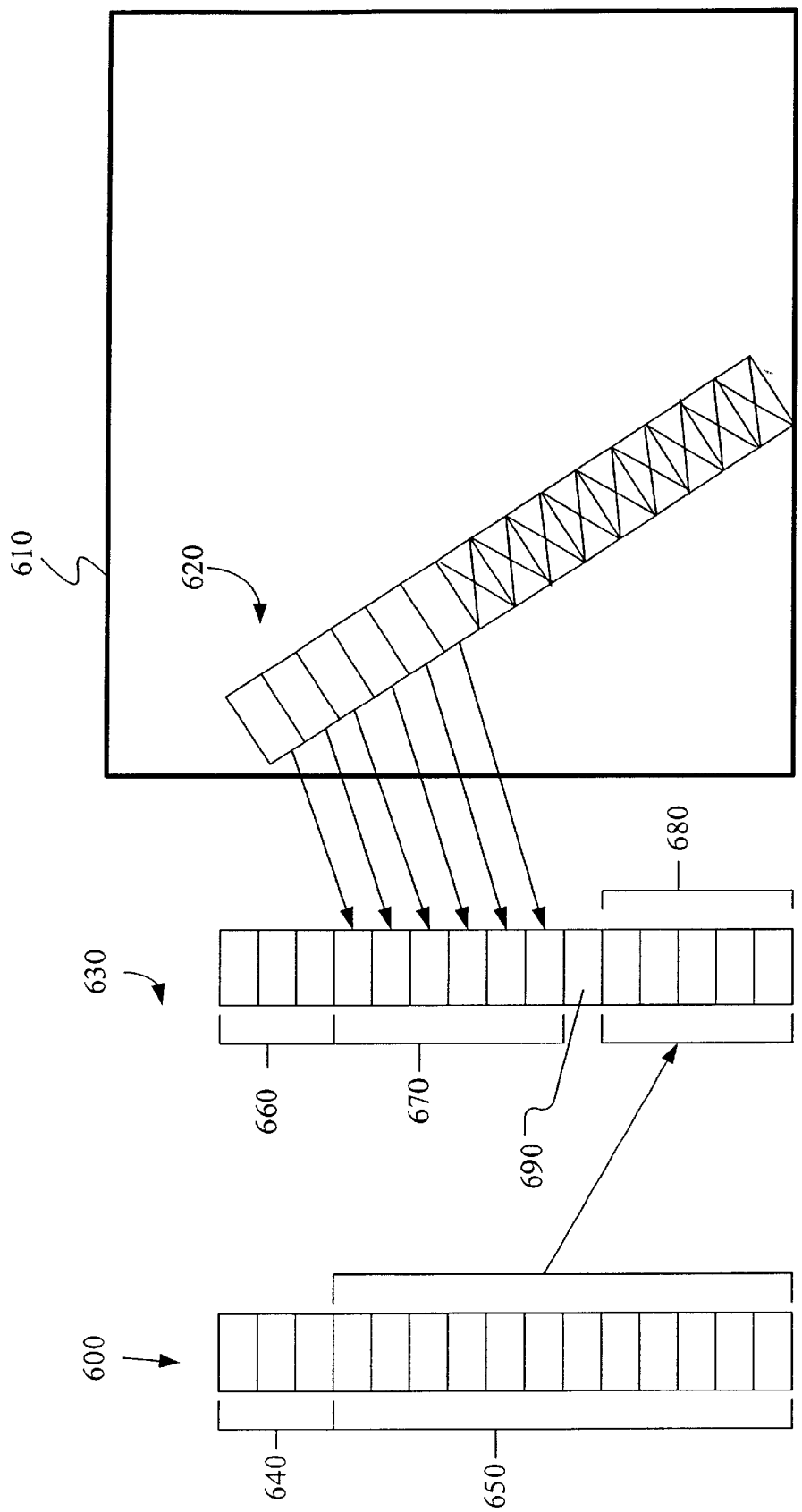
FIG. 6B

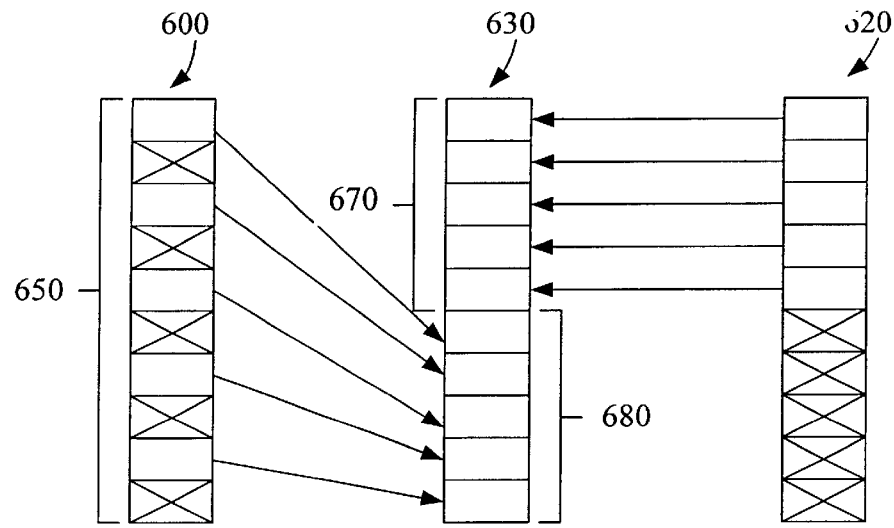
FIG. 7
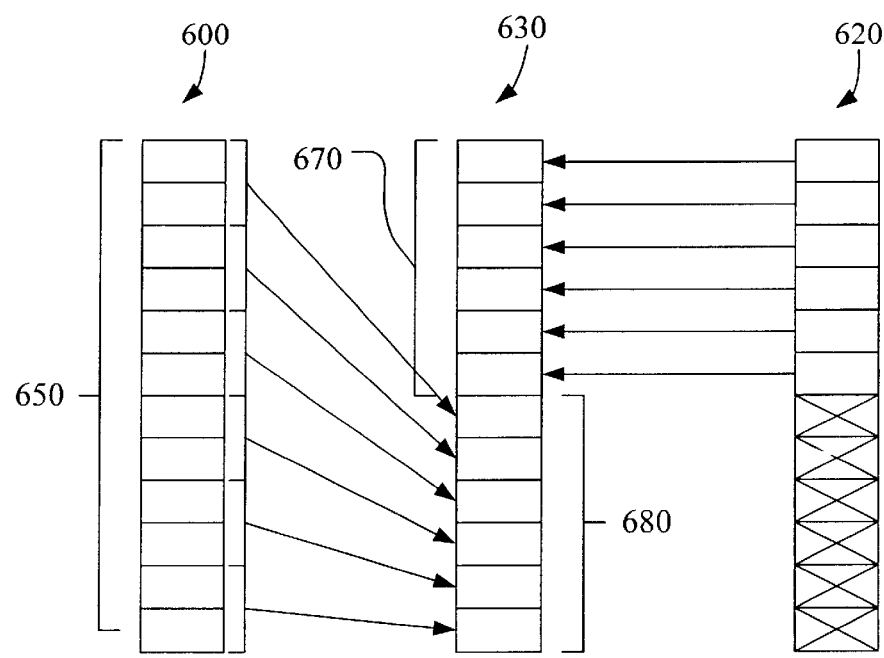
FIG. 8

SAMPLE COLOR MAPPING

| NEXRAD | Approx. Reflectivity [dBZ] | Color |
|---|---|---|
| 0-3 | < 20 | Black |
| 4-5 | 20 < dBZ < 30 | Green |
| 6-7 | 30 < dBZ < 40 | Yellow |
| 8-15 | > 40 | Red |

TABLE 1

FIG. 9

RETROFIT SOLUTION FOR THE INTEGRATION OF GROUND-BASED WEATHER RADAR IMAGES WITH ON-BOARD WEATHER RADAR

CROSS-REFERENCE TO RELATED APPLICATIONS

Reference is made to a co-pending and commonly assigned patent application entitled WEATHER RADAR SYSTEM INTEGRATING GROUND-BASED WEATHER RADAR WITH ON-BOARD AIRCRAFT WEATHER RADAR, Ser. No. 09/645,085, filed Aug. 24, 2000, which is herein incorporated by reference in its entirety.

FIELD OF THE INVENTION

The present invention relates to on-board weather radar for use on aircraft or other vehicles. More particularly, the present invention relates to methods and apparatus for providing ground-based weather radar information to a pilot using existing on-board weather radar indicators.

BACKGROUND OF THE INVENTION

Weather has been identified as a cause or contributing factor to nearly 25% of aviation accidents and 35% of fatalities. Accidents occur when a chain of events leads to a failure of an aircraft system, a mistake on part of the crew piloting the aircraft, or a combination thereof. Improved levels of weather information and the use of pilot decision aids may be helpful in breaking the chain of events that leads to an accident.

In addition to creating hazardous situations, weather is a common cause of flight delays. For example, in the United States, more than 70% of delays are attributed to weather conditions. While the industry will always have some level of delay caused by extreme weather, there is a growing belief that improved weather information in the cockpit could improve efficiency for the overall system.

On-board weather radar is a tactical navigation aid that shows convective hazards for the next 15 to 30 minutes of flight. The on-board weather radar currently serves as the focus of a pilot's awareness of the weather situation. It provides a graphical depiction of precipitation relative to the aircraft's position. The presence of turbulence can be inferred from these reflections off of precipitation. Through the use of Doppler processing, turbulence can also be detected and displayed directly.

While the on-board weather radar has proven invaluable as a real-time source of tactical weather information, the range is limited. Additionally, the beam width of on-board weather radar increases significantly at longer ranges, making it difficult to perform fine resolution of precipitation patterns.

To enhance safety and efficiency, government and industry are attempting to improve the availability and quality of weather information available to flight crews. It is desirable to provide flight crews with weather information which has been up-linked from a ground-based weather radar system. One such ground-based weather radar system is the Next Generation Weather Radar (NEXRAD) system, the data from which is available via the Internet or other sources. These ground-based weather radar systems offer a strategic view of weather over a larger region than possible with on-board weather radar. The NEXRAD system includes ground-based radar sites distributed across the continental United States. The NEXRAD system is used to create a series of weather products, including base reflectivity, composite reflectivity, hail indices, and storm tracking information, to name a few. Generally, NEXRAD provides an excellent strategic view of the weather situation, but would likely suffer in cockpit applications from latencies due to acquisition, processing and up link.

The pilot community has expressed interest in up-linking ground-based radar images, like those available from NEXRAD, to the cockpit as has been proposed. Several industry-led programs have focused on development of applications for displaying these images in the cockpit of an aircraft. Generally, these efforts have assumed the presence of a relatively large, high-resolution display. However, many aircraft currently in service in the industry are not equipped with these types of displays, and further may not have the panel real estate to retrofit such a display. Consequently, a method of providing both on-board weather radar information and ground-based weather radar information to flight crews in aircraft having limited panel real estate would be a significant improvement in the art.

Providing the ground-based weather radar information to the pilot of the aircraft presents additional difficulties in existing avionics systems. The standard weather radar bus and indicator (display), which are ubiquitous in commercial and high-end general aviation aircraft, are limited in display capability provided by these mature standards. Therefore, a method of providing ground-based weather radar information to the pilot using existing flight decks would be a significant improvement in the art.

SUMMARY OF THE INVENTION

A method of integrating ground-based radar information into an existing on-board aircraft radar system, where a radar indicator displays on-board radar images as a function of data words received from a receiver/transmitter of the on-board aircraft radar system, includes receiving ground-based radar data indicative of a ground-based radar image. A data word from an output stream of the receiver/transmitter of the on-board aircraft radar system is captured, with the captured data word being encoded in a first data word format. A position and heading of the aircraft is determined, and the ground-based radar data is sampled to obtain sampled ground-based radar data corresponding to the position and heading of the aircraft and to a radial scan angle for the captured data word. The sampled ground-based radar data and the captured data word are combined into a composite data word, with the composite data word being encoded in the first data word format. The composite data word is provided to the radar indicator for use in displaying a composite weather radar image having both on-board weather radar imagery and ground-based weather radar imagery.

BRIEF DESCRIPTION OF THE DRAWINGS

FIG. 1 is a block diagram illustrating a prior art on-board weather radar system.

FIG. 2 is a block diagram illustrating an on-board weather radar system in accordance with the invention which integrates on-board weather radar data with up-linked weather radar data from a ground-based system.

FIG. 3A is an illustration of prior art on-board weather radar imagery.

FIG. 3B is an illustration of prior art ground-based weather radar imagery.

FIG. 4A is an illustration of the display of ground-based weather radar imagery on an on-board weather radar indicator in accordance with the present invention.

FIG. 4B is an illustration of a composite of on-board and ground-based weather radar imagery in accordance with the present invention.

FIGS. 5A–5C are illustrations of the composite on-board and ground-based weather radar imagery provided by weather radar systems of the present invention.

FIGS. 6A, 6B, and 7–9 are diagrammatic illustrations of methods, which can be used to retrofit existing flight decks, of integrating ground-based weather radar data with on-board weather radar data in an Aeronautical Radio, Inc (ARINC) 453 data word format.

FIG. 9 is a table illustrating color mapping between ground-based weather radar and on-board weather radar in accordance with some embodiments of the invention.

DETAILED DESCRIPTION OF AN ILLUSTRATIVE EMBODIMENT

FIG. 1 is a block diagram illustrating a prior art weather radar system 100. System 100 includes radome 110, antenna (shown with mount) 115, receiver/transmitter 120, controller 130 and radar indicator or display 140. Under the control of controller 130, receiver/transmitter 120 transmits a radar pulse through antenna 115 and radome 110 in one particular direction at a time. The radar pulse travels outward from the aircraft in the particular direction and reflects off of precipitation or other weather phenomena. As reflections come back and are received by antenna 115 and receiver/transmitter 120, an indication of the weather at different distances (out to a range) along a straight line in the particular direction can be ascertained. The data that is received by receiver/transmitter 120 is put into a data stream and provided to radar indicator (display) 140 for displaying weather radar information to the pilot. As antenna 115 sweeps back and forth, data for hundreds of these "radials" are obtained every sweep, thus providing a complete picture of the weather in front of the aircraft. A radial can be defined as weather radar information along a line, out to a range, for a given tilt angle and scan angle from the aircraft as is known in the art.

In conventional on-board weather radar systems, the data that is received is frequently put into an ARINC 453 weather radar data structure, for example ARINC CHARACTERISTIC 708A. Each word of this data structure includes data representing the intensity of the weather at a multiplicity of points along the straight line of a radial out to a range, which is typically no greater than about 100 miles. The intensity data for each of the points represented in the ARINC 453 word is stored in range bins of the word. The ARINC 453 word also includes header information indicative of the range and direction for the radial.

FIG. 3A is a representation of an on-board weather radar image 300 of the type which is typically displayed by radar indicator 140 of system 100 shown in FIG. 1. Based upon the color of different pixels or areas shown in image 300, the pilot of the aircraft (aircraft represented graphically at 305) can determine the intensity and direction of weather conditions or phenomena ahead of the aircraft. As shown in FIG. 3A, on-board weather radar typically provides an accurate indication of weather conditions to a range of approximately 100 miles from the aircraft. Given the high travel speeds which are typical of many aircraft, this can represent as little as ten or fifteen minutes of travel. FIG. 3B illustrates ground-based weather radar image 320 which is available from a weather information service provider. Image 320 represents a prior art NEXRAD bit map or graphical representation of weather.

FIG. 2 is a block diagram illustrating weather radar system 200 adapted for use on an aircraft in accordance with the present invention. Weather radar system 200 combines on-board weather radar information with up-linked, ground-based weather radar information, displaying them simultaneously on the same indicator. This provides pilots with both real-time tactical information and longer-range strategic views. As will be discussed below in greater detail, the concept is applicable to dedicated weather radar indicators, to existing Electronic Flight Instrument System (EFIS) based weather radar displays, and to yet to be developed display hardware. Further, in some embodiments, weather radar system 200 is adapted to provide ground-based weather radar images (for example see FIG. 4A), without being integrated with on-board weather radar images, on these existing indicators or displays. This requires conversion of the ground-based bit map type data into a ARINC 453 data bus format as is discussed later in greater detail.

Referring back to embodiments in which on-board weather radar information is displayed simultaneously with ground-based weather radar information on the same indicator, the co-display of the two radar images utilizes the strengths of the two sources of information. The on-board radar provides a real-time view of the weather within close range to the aircraft—where the pilot needs real-time information. The NEXRAD (or other ground-based radar) data, on the other hand, cannot be considered real-time for this aviation application. There are delays due to the time required in processing, distributing and transmitting the data. However, NEXRAD data can be displayed for the longer ranges, providing information beyond the range of the on-board radar. At these ranges, the age of the data is not as critical.

System 200 includes radome 110, antenna 115, receiver/transmitter 220, controller 230, radar indicator 240, pilot input device 242, data link or communication system 250, and weather radar data integration circuitry 260. System 200 also utilizes position/heading information provided from a position/heading determining system 270, which can be for example a Global Positioning System (GPS) receiver.

Controller 230, receiver/transmitter 220 and antenna 115 function substantially or identically to the manner in which the similar components in system 100 function. Thus, under the control of controller 230, receiver/transmitter 220 sequentially transmits pulses through antenna 115 in each of a large number of directions to obtain information 222 for multiple radials required to produce an on-board weather radar image such as image 300 shown in FIG. 3A. This information 222 is provided to weather radar data integration circuitry 260, which can be a suitably programmed processor or other circuitry. As will be discussed below in greater detail, integration circuitry 260 can be existing circuitry, in retrofit radar systems, adapted or programmed to implement the functions of the present invention.

Data link 250 is a communication system which is adapted to receive up-linked weather radar data 252 from a ground-based weather radar system and to provide this ground-based weather radar data to weather radar data integration circuitry 260. For example, the up-linked ground-based weather radar data can be received from a ground-based transmitter which obtains the weather radar data from the internet or from other sources. In exemplary embodiments, the ground-based weather radar information 252 includes data representative of a NEXRAD image in a format such as the bit map (BMP) or Graphic Interchange Format (GIF) formats. FIG. 3B illustrates an image 320 of this type.

Using position and heading information 272 provided by position/heading determining system 270, weather radar data integration circuitry 260 determines the relevant portion of the up-linked ground-based weather radar data 252 for the current position and heading of the aircraft. In other words, based on the position and heading of aircraft 305, data integration circuitry 260 can extract from the total up-linked ground-based weather radar data 252 the portions corresponding to the radials obtained by the on-board radar (see FIG. 3A). However, these portions will typically extend to a range beyond the range obtained by the on-board radar system, and only data corresponding to selected ranges need be identified.

Data integration circuitry 260 combines the on-board weather radar data 222 with the ground-based weather radar data 252 and produces composite weather radar data 262 which is provided to radar indicator 240. Using composite weather radar data 262, radar indicator 240 provides display images such as image 400 shown in FIG. 4B. As can be seen in FIG. 4B, using data 262 radar indicator 240 displays composite radar image 400 with both on-board weather radar imagery 402 and ground-based weather radar imagery 404 shown together relative to a position of the aircraft represented at 305. The on-board weather radar imagery 402 illustrates weather information for positions which are closer to the aircraft, while ground-based weather radar imagery 404 illustrates weather information at positions further from the position of the aircraft.

Pilot input device 242 is used by the pilot to control radar indicator 240. For example, using input device 242, the pilot can change the range of displayed information. Simultaneously providing on-board weather radar imagery for the near ranges and ground-based weather radar imagery for the outer ranges, on a single weather radar indicator, is a highly beneficial tool for the pilot of the aircraft.

In some embodiments, input device 242 can be used to control radar indicator 240 such that only ground-based weather radar imagery is shown. FIG. 4A is an illustration of the display on radar indicator 240 of only ground-based weather radar imagery 350 in accordance with the these embodiments of the present invention. Ground-based weather radar imagery 350 is provided by encoding ground-based weather radar data 252 onto a ARINC 453 data bus, as is described below in greater detail with reference to FIGS. 6A, 6B, 7, 8 and 9.

The images shown in FIGS. 3A and 4A represent the same weather pattern, with image 300 (FIG. 3A) showing the weather pattern as determined from on-board radar and image 350 (FIG. 4A) representing the weather pattern as determined from ground-based radar. As can be seen, the ground-based radar provides greater weather detail at certain ranges. In this example, the aircraft was flying at 22,000 feet. By comparing FIGS. 3A and 4A, it can be seen that the NEXRAD image 350 includes precipitation which is underneath the view of the on-board radar. Also, notice that as the range increases outward, the on-board radar detects more of the precipitation shown in the NEXRAD image. This is due to the increasing beam width of the on-board radar as a function of distance from the aircraft.

Since the NEXRAD image 350 provides weather information which is not available in the on-board radar image 300, it is desirable to provide this information to the pilot of the aircraft. However, as discussed previously, limited panel real estate in the cockpit of most aircraft renders it difficult to install new displays which support bitmap type images such as are typically used to display NEXRAD images in non-aviation environments. Therefore, the methods of the present invention which allow ground-based weather radar information to be displayed using existing radar indicators is highly desirable.

Referring back to FIG. 4B, also illustrated in greater detail is portion 410 of image 400. As can be seen more clearly in portion 410 which is enlarged for ease of illustration, image 400 includes delineating symbology or graphical separator 420 positioned between on-board weather radar imagery 402 and ground-based weather radar imagery 404. Separator 420 provides an indication, which is quickly discernable by the pilot of the aircraft, of which portions of display image 400 correspond to on-board weather radar imagery 402 and which portions correspond to ground-based weather radar imagery 404.

FIGS. 5–A, 5–B and 5–C provide additional illustrations of composite radar images which can be displayed on radar indicator 240 in accordance with the present invention. In FIG. 5A, composite image 500 is shown, with on-board weather radar imagery 502 shown in the lower central regions of the image, and with the ground-based radar imagery 504 shown in the upper and outer portions of the image. In this embodiment, delineating symbology 520, which separates imagery 502 from imagery 504, is a solid line instead of a dashed line. Also, as shown in FIG. 5A, symbology 520 can include data 522 indicating the age of the ground-based weather radar data. Data 522 can be positioned on or in close proximity to symbology 520 as illustrated, or can be positioned elsewhere on image 500.

FIGS. 5B and 5C illustrate image 550 showing composite weather radar information at two separate ranges relative to a position of the aircraft (reference at 555). In FIG. 5B, on-board weather radar imagery 552 is shown relative to ground-based weather radar imagery 554, with the total range of composite weather radar information extending to approximately 400 miles. As can be seen by the position of delineating symbology 570, the range of the on-board weather radar information is approximately 100 miles out of the 400 mile total range. This view provides the pilot of the aircraft with greater long-range strategic weather information.

In contrast, in FIG. 5C, the same image 550 is shown, but with the range limited to approximately 160 miles. Thus, in the view shown in FIG. 5C, the portion of screen of radar indicator 240 used to show on-board weather radar imagery 552 increase, while the portion of the radar indicator screen used to illustrate ground-based weather radar imagery 554 decreases. Thus, this view provides the pilot with more detailed short-range tactical weather radar information. Generally, the pilot of the aircraft would control the total composite range, and thereby control the short-range and long-range weather radar data detail, using a pilot input device 242 (shown in FIG. 2). Further, in some embodiments of the present invention, the pilot uses input device 242 to control not only the total range of the composite radar image, but also the total range of the on-board radar portion of the image. At one extreme, the pilot can reduce the range of displayed on-board radar data to zero such that the radar indicator displays only ground-based radar data, for example as shown in FIG. 4A.

While one of ordinary skill in the art, having the benefit of this disclosure, can implement the concepts of the present invention in a variety of different formats, a particular challenge relates to the issue of retrofitting existing aircraft flight decks. Integrating the display of up-linked ground-based weather radar information with on-board radar information, in the flight decks of existing aircraft, presents unique challenges. A standard interface between the receiver/transmitter and the radar indicator is an ARINC 453 data bus. Each ARINC 453 data word being transmitted to the indicator on the ARINC 453 bus contains the data for one radial. A stream of these data words is successfully displayed on the indicator as the radar antenna sweeps along the horizontal axis. Each data word includes, among other things, the following information: (1) header information including vertical tilt angle, horizontal scan angle, range, and mode and alert flags; and (2) range bin data. In a 1600 bit ARINC 453 data word, the range bin data constitutes the bulk of the 1600 bits. The range bins store the radar reflection data in three-bit sets. Each range bin is displayed as a pixel on the radar indicator to indicate the precipitation rate or hazard for that location.

As discussed above with reference to FIG. 2, one way to display up-linked weather radar data is to encode the up-linked data onto the on-board weather radar bus. This solution can involve intercepting, modifying and reinserting ARINC 453 data words between the receiver/transmitter (for example receiver/transmitter 220) and the indicator (for example indicator 240). As described, this weather radar data integration function performed by circuitry 260 requires data indicative of the aircraft's position and heading.

In some embodiments of the present invention which can be used to retrofit existing weather radar equipment in existing flight decks, the on-board radar data is down sampled and moved to the lower range bins (i.e., the range bins corresponding to positions closer to the aircraft) The ground-based weather radar data (i.e., a NEXRAD image) is sampled relative to the aircraft's position and copied into the outer range bins (i.e., the range bins corresponding to positions further from the aircraft). In embodiments in which only ground-based radar information is to be displayed on the radar indicator, all range bins can be filled with sampled data from the NEXRAD image. The header information in the data word (e.g., the range) can also be adjusted, if needed. The radar indicator then displays the on-board radar data for the region closest to the aircraft and the up-linked data for the region farthest from the aircraft. As can be seen in FIGS. 4A, 4B and 5A–5C, this scheme displays the weather relative to the aircraft's heading, rather than a north up orientation.

FIG. 6A is a diagrammatic illustration of a method in which weather radar data integration circuitry 260 can replace the ARINC 453 data words in on-board weather radar data 222 (FIG. 2) with composite ARINC 453 data words in data 262 which contain both on-board weather radar information and up-linked ground-based weather radar information. On the left-hand side of FIG. 6A, a diagrammatic representation 600 of an ARINC 453 data word is shown. Data word 600 includes header data bits 640 (which can be for example the first 64 bits of data word 600) and range bins 650. Diagrammatically represented on the right-hand side of FIG. 6A is a NEXRAD image 610, which is typically a BMP or JPEG image representing intensity data at each of the pixel elements. Shown diagrammatically within image 610 is an equivalent radial 620. Equivalent radial 620 does not include header information, but is representative of range bin type data for various ranges along the direction of the radial. From the ground-based radar image equivalent radial 620, and from the on-board weather radar data word 600 (which represents weather intensity data in the same direction as radial equivalent 620), a composite ARINC 453 weather radar data word can be constructed (shown at 630).

If necessary due to changes in the illustrated range, header information 640 can be replaced with new header information 660. The on-board radar data in range bins 650 is then down sampled and moved into lower range bins 680 of the new data word 630. Various methods of down sampling the on-board radar data are described below with reference to FIGS. 7 and 8. The remaining range bins of composite data word 630 are copied from the NEXRAD image 610. The NEXRAD image is sampled relative to the aircraft's position and heading, over the desired range, and the information is copied into the outer range bins 670 of the new word. Range bins marked with an "X" indicate discarded data.

The method described above can be summarized as follows. Ground-based radar data indicative of a ground-based radar image is received. A data word from an output stream of the receiver/transmitter of the on-board aircraft radar system is captured, with the captured data word being encoded in a first data word format such as the ARINC 453 data word format. A position and heading of the aircraft is determined and the ground-based radar data is sampled to obtain sampled ground-based radar data corresponding to the position and heading of the aircraft and to a radial scan angle for the captured data word. The sampled ground-based radar data and the captured data word are combined into a composite data word, with the composite data word being encoded in the first data word format. The composite data word is provided to the radar indicator for use in displaying a composite weather radar image having both on-board weather radar imagery and ground-based weather radar imagery.

FIG. 6B illustrates further aspects of certain embodiments of the invention in greater detail. As shown diagrammatically in FIG. 6B, the step of combining the sampled ground-based radar data (data corresponding to equivalent radial 620) and the captured data word 600 into a composite data word 630 can further include adding delineating symbology data 690 to the composite data word which will be used by the radar indicator to display delineating symbology between the on-board weather radar imagery and the ground-based weather radar imagery. In addition or in the alternative, header 660 and/or data 690 can include time stamp data which will be used by the radar indicator to display age information for the ground-based weather radar imagery.

As shown in FIG. 7 and with reference to FIGS. 6A and 6B, down-sampling range bin data 650 from on-board weather radar data word 600 can be accomplished by copying every $N_{th}$ range bin in data word 600 into corresponding lower range bins 680 of word 630 as illustrated. In the particular illustration, one out of every two range bins in data word 600 is copied to lower range bins 680 of data word 630. However, the present invention is applicable to embodiments in which variable N has a value other than two.

FIG. 8 illustrates an alternate embodiment in which range bins 650 in data word 600 are down-sampled and copied to lower range bins 680 of data word 630 using techniques such as averaging or highest intensity determination. For example, in some embodiments, every one of lower range bins 680 of data word 630 contains information which is indicative of an average of N consecutive range bins from data word 600. In another embodiment, for every N consecutive range bins in data word 600, the range bin containing data indicative of the highest intensity weather is selected and copied to one of the corresponding lower range bins 680 of data word 630. In each of FIGS. 7 and 8, range bins marked with an X are indicative of discarded data which is not transferred or represented in composite data word 630.

An important issue which must be addressed in the combining of ground-based weather radar data with on-board weather radar data relates to color mapping. Ground-based weather products often use a different color standard than that used in airborne radar. However, many experts suggest that the colors (for example black, green, yellow and red) of the radar image should represent the same thing for the pilot, regardless of the source. In one embodiment of the present invention, the sixteen NEXRAD intensity (color) levels are mapped to the four colors (black, green, yellow and red) of an exemplary conventional on-board weather radar system. The mapping is this embodiment can be accomplished using the relationships illustrated in Table 1 shown in FIG. 9.

The mapping specified in Table 1 causes loss of some of the information originally contained in the NEXRAD (or other ground-based weather radar) image. However, by making this conversion on the ground, prior to transmission to the aircraft, the bandwidth requirements for the up-linked images can be halved. Thus, by converting prior to transmission, each pixel will require two bits of data, rather than four bits. By using a compression method, like run-length encoding, the bandwidth requirements can be reduced even further.

Although the present invention has been described with reference to illustrative embodiments, workers skilled in the art will recognize that changes may be made in form and detail without departing from the spirit and scope of the invention.

What is claimed is:

1. A method of integrating ground-based radar information into an existing on-board aircraft radar system where a radar indicator displays on-board radar images as a function of data words received from a receiver/transmitter of the on-board aircraft radar system, the method comprising:

receiving ground-based radar data, up-linked to the aircraft, indicative of a ground-based radar image;

capturing a data word from an output stream of the receiver/transmitter of the on-board aircraft radar system, the captured data word being encoded in a first data word format;

determining a position and heading of the aircraft;

sampling the ground-based radar data indicative of the ground-based radar image to obtain sampled ground-based radar data corresponding to the position and heading of the aircraft and to a radial scan angle for the captured data word;

combining the sampled ground-based radar data and the captured data word into a composite data word, the composite data word being encoded in the first data word format; and providing the composite data word to the radar indicator for use in displaying a composite weather radar image having both on-board weather radar imagery and ground-based weather radar imagery.

2. The method of claim 1, wherein the step of combining the sampled ground-based radar data and the captured data word into a composite data word further comprises modifying a header of the captured data word such that a header of the composite data word reflects an overall range of the composite weather radar image.

3. The method of claim 1, wherein the step of combining the sampled ground-based radar data and the captured data word into a composite data word further comprises adding delineating symbology data to the composite data word which will be used by the radar indicator to display delineating symbology between the on-board weather radar imagery and the ground-based weather radar imagery.

4. The method of claim 3, wherein the step of combining the sampled ground-based radar data and the captured data word into a composite data word further comprises adding time stamp data to the composite data word which will be used by the radar indicator to display age information for the ground-based weather radar imagery.

5. The method of claim 1, wherein receiving the ground-based radar data further comprises receiving ground based radar data indicative of a NEXRAD image.

6. The method of claim 5, wherein capturing the first data word in the first data word format further comprises capturing the first data word, with the first data word being in the ARINC 453 data word format.

7. The method of claim 6, wherein the step of combining the sampled ground-based radar data and the captured ARINC 453 data word into a composite ARINC 453 data word further comprises:

down sampling a plurality of range bins of the captured ARINC 453 data word to obtain down sampled range bin data; and filling lower range bins of the composite ARINC data word with the down sampled range bin data, wherein lower range bins contain data used to display radar imagery at ranges proximate the aircraft.

8. The method of claim 7, wherein the step of combining the sampled ground-based radar data and the captured ARINC 453 data word into a composite ARINC 453 data word further comprises:

identifying portions of the sampled ground-based radar data corresponding to desired ranges; and filling upper range bins of the composite ARINC data word with the portions of the sampled ground-based radar data corresponding to the desired ranges, wherein upper range bins contain data used to display radar imagery at ranges farthest from the aircraft.

9. The method of claim 8, wherein down sampling the plurality of range bins of the captured ARINC 453 data word to obtain down sampled range bin data further comprises copying data from every $N^{th}$ range bin in the plurality of range bins, where N is greater than or equal to 2.

10. The method of claim 8, wherein down sampling the plurality of range bins of the captured ARINC 453 data word to obtain down sampled range bin data further comprises averaging over N range bins in the plurality of range bins, where N is greater than or equal to 0, and may include fractions of range bins.

11. The method of claim 8, wherein down sampling the plurality of range bins of the captured ARINC 453 data word to obtain down sampled range bin data further comprises determining, over a range of N range bins in the plurality of range bins where N is greater than or equal to 0 and not necessarily an integer which range bin contains data representative of a highest intensity of weather.

12. The method of claim 1, wherein the step of receiving ground-based radar data, up-linked to the aircraft, further includes receiving run-length encoded data to reduce uplink bandwidth requirements and on-board storage requirements of the uplinked data.

13. A method of displaying ground-based radar information on an existing on-board aircraft radar system where a radar indicator displays radar images as a function of data words received from a receiver/transmitter of the on-board aircraft radar system, the data words from the receiver/transmitter being encoded in a first data word format, the method comprising:

receiving ground-based radar data, up-linked to the aircraft, indicative of a ground-based radar image;

determining a position and heading of the aircraft;

sampling the ground-based radar data indicative of the ground-based radar image to obtain sampled ground-based radar data corresponding to the position and heading of the aircraft;

encoding the sampled ground-based radar data into ground-based data words encoded in the first data word format; and providing the ground-based data words encoded in the first data word format to the radar indicator for use in displaying ground-based weather radar imagery.

14. The method of claim 13, wherein the step of encoding the sampled ground-based radar data into ground-based data words encoded in the first data word format further includes adding time stamp data to the ground-based data words which will be used by the radar indicator to display age information for the ground-based weather radar imagery.

15. The method of claim 13, wherein receiving the ground-based radar data further comprises receiving ground based radar data indicative of a NEXRAD image.

16. The method of claim 13, wherein the first data word format is the ARINC 453 data word format.

17. The method of claim 13, wherein the step of receiving ground-based radar data, up-linked to the aircraft, further includes receiving run-length encoded data to reduce uplink bandwidth requirements and on-board storage requirements of the uplinked data.

* * * * *